United States Patent
Claeson et al.

(10) Patent No.: US 12,245,069 B2
(45) Date of Patent: Mar. 4, 2025

(54) CLIENT DEVICE FOR INDICATION OF NON-FULFILLMENT OF LATENCY REQUIREMENTS

(71) Applicant: Huawei Technologies Co., Ltd., Shenzhen (CN)

(72) Inventors: Gustaf Claeson, Lund (SE); Rama Kumar Mopidevi, Lund (SE); Bengt Lindoff, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 529 days.

(21) Appl. No.: 17/534,234

(22) Filed: Nov. 23, 2021

(65) Prior Publication Data

US 2022/0086684 A1 Mar. 17, 2022

Related U.S. Application Data

(63) Continuation of application No. PCT/EP2019/063390, filed on May 23, 2019.

(51) Int. Cl.
*H04W 24/04* (2009.01)
*H04L 43/08* (2022.01)
(Continued)

(52) U.S. Cl.
CPC ......... *H04W 28/0268* (2013.01); *H04L 43/08* (2013.01); *H04W 24/04* (2013.01); *H04W 24/08* (2013.01)

(58) Field of Classification Search
CPC ......... H04W 28/0268; H04W 28/0236; H04W 24/04; H04W 24/08; H04L 43/08; H04L 47/283
See application file for complete search history.

(56) References Cited

U.S. PATENT DOCUMENTS 11,778,491 B2 * 10/2023 Yao .................. H04W 24/08
370/252
2015/0071260 A1 * 3/2015 Chun ................ H04W 72/0446
370/336
(Continued)

FOREIGN PATENT DOCUMENTS

CN 108631954 A 10/2018
CN 108924853 A 11/2018
(Continued)

OTHER PUBLICATIONS

"3rd Generation Partnership Project; Technical Specification Group Radio Access Network; NR; Requirements for support of radio resource management (Release 15)," 3GPP TS 38.133 V15.5.0, total 893 pages, 3rd Generation Partnership Project, Valbonne, France (Mar. 2019).

(Continued)

*Primary Examiner* — Meng Vang
*Assistant Examiner* — Hector Reyes
(74) *Attorney, Agent, or Firm* — Leydig, Voit & Mayer, Ltd.

(57) ABSTRACT

A client device and a corresponding method for detecting and indicating non-fulfilment of latency requirements of uplink data packets associated with an application are provided. The client device monitors transmissions of uplink data packets associated with the application, in a first layer, for non-fulfilment of latency requirements of the uplink data packets. The monitoring is based on a Quality-of-Service (QoS) monitoring configuration. Upon detection of a non-fulfilment of a latency requirement, the client device provides a first indication to a second layer. The first indication provides an early warning about non-fulfillment of latency requirements of uplink data packets. According to the application, the client device is allowed to take precautionary (Continued)

actions to counteract possible negative consequences of the non-fulfillment of latency requirements.

20 Claims, 7 Drawing Sheets

(51) Int. Cl.
*H04W 24/08* (2009.01)
*H04W 28/02* (2009.01)

(56) References Cited

U.S. PATENT DOCUMENTS

| | | | |
|---|---|---|---|
| 2017/0078058 A1* | 3/2017 | Marinier | H04L 5/0044 |
| 2017/0325120 A1* | 11/2017 | Szilagyi | H04L 41/5067 |
| 2019/0150176 A1* | 5/2019 | Pelletier | H04W 28/0278 |
| | | | 370/329 |
| 2020/0044974 A1* | 2/2020 | Jiang | H04L 43/16 |
| 2020/0196327 A1* | 6/2020 | Zhang | H04W 72/21 |
| 2020/0280872 A1* | 9/2020 | Fiorani | H04W 28/24 |

FOREIGN PATENT DOCUMENTS

| | | |
|---|---|---|
| WO | 2017172937 A1 | 10/2017 |
| WO | 2017197264 A1 | 11/2017 |
| WO | 2018232259 A1 | 12/2018 |
| WO | WO-2018228547 A1 * 12/2018 | ....... H04L 12/40202 |

OTHER PUBLICATIONS

"3rd Generation Partnership Project;Technical Specification Group Radio Access Network;NR;Medium Access Control (MAC) protocol specification (Release 15)," 3GPP TS 38.321 V15.5.0, total 78 pages, 3rd Generation Partnership Project, Valbonne, France (Mar. 2019).

"3rd Generation Partnership Project;Technical Specification Group Radio Access Network;NR;Radio Link Control (RLC) protocol specification (Release 15)," 3GPP TS 38.322 V15.5.0, total 33 pages, 3rd Generation Partnership Project, Valbonne, France (Mar. 2019).

"3rd Generation Partnership Project;Technical Specification Group Radio Access Network;NR;Radio Resource Control (RRC) protocol specification (Release 15)," 3GPP TS 38.331 V15.5.1, total 491 pages, 3rd Generation Partnership Project, Valbonne, France (Apr. 2019).

"3rd Generation Partnership Project;Technical Specification Group Radio Access Network;Study on Scenarios and Requirements for Next Generation Access Technologies; (Release 15)," 3GPP TR 38.913 V15.0.0, total 39 pages, 3rd Generation Partnership Project, Valbonne, France (Jun. 2018).

* cited by examiner

CLIENT DEVICE FOR INDICATION OF NON-FULFILLMENT OF LATENCY REQUIREMENTS

CROSS-REFERENCE TO RELATED APPLICATIONS

This application is a continuation of International Application No. PCT/EP2019/063390, filed on May 23, 2019, the disclosure of which is hereby incorporated by reference in its entirety.

TECHNICAL FIELD

Embodiments of the disclosure relate to a client device for detecting and indicating non-fulfilment of latency requirements of uplink data packets associated with an application. Furthermore, embodiments of the disclosure also relate to corresponding methods and a computer program.

BACKGROUND

A critical requirement of 3GPP 5G new radio (NR) is the support for ultra-reliable low latency communication (URLLC) services, where latency expresses the time required for transmitting a message through the network. The requirement in Rel-15 for URLLC has been set to a latency of 1 ms, one way over the radio access network, combined with a packet error rate (PER) of 10e-5. For Rel-16 it is expected that the requirements will be set even tougher.

An application will request certain Quality-of-Service (QoS) of the 5G network and may have multiple data streams, each with an individual QoS setting. If the requested levels of QoS are accepted by the 5G network, the 5G network will try to fulfil its QoS obligations towards the application over time. In wireless networks, there are several factors affecting the QoS that can be achieved in reality such as e.g. unpredictable movement of the client device or movement from other objects causing blocking of radio signals. Hence, there will be situations where the negotiated QoS will not be met.

For future application types, targeted by NR, this fact may be critical. Example of areas for such URLLC traffic can be within the road traffic control and management, production industry or health care, with applications such as remote driving, platooning, factory automation or remote surgery. These are typical examples of applications that do not only require demanded QoS but also represent cases where an instantaneous failure or rapid degradation of the actually delivered QoS from the radio access network can have dire consequences. This fact has been lifted by organizations, such as 5GAA and 5G-ACIA, setting the input requirements for 5G focusing on vehicle and industrial use cases, respectively, where prediction of delivered QoS is seen as an important area.

Packet duplication, which is one way to increase the reliability, was introduced in Rel-15 to facilitate URLLC services. In Rel-15, packet duplication is configured with either carrier aggregation (CA) or dual connectivity (DC). In future releases, packet duplication with DC and CA will also be supported. For the duplication case the network ensures using different component carriers for the respective transmission of different radio link control entities with logical channel mapping restrictions.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to obtain a QoS monitoring configuration associated with an application;

monitor transmissions of uplink data packets associated with the application, in a first layer, for non-fulfilment of latency requirements of the uplink data packets based on the QoS monitoring configuration;

provide a first indication to a second layer upon detection of a non-fulfilment of a latency requirement.

An application herein can be understood to be any service that can be supported in the wireless communication network and which can use communication resources in the core network and the radio access network. Examples of applications are factory automation, augmented reality, virtual reality, and vehicle-to-anything. Unless otherwise stated the application herein corresponds to an application in the client device. The application in the client device can typically be arranged to communicate with a corresponding application in a data network or a core network. The application can have one or more QoS flows and the QoS monitoring configuration can be applicable to one or more of the QoS flows.

The second layer can be a layer higher in a layer stack than the first layer. Hence, the second layer is a layer above the first layer in a layer stack.

An advantage of the client device according to the first aspect is that it enables a low latency solution to offer an early QoS warning to improve robustness as a complementary safety mechanism for future 5G applications. Applications where failure to meet QoS requirements can have dire consequences to the client device hosting the 5G modem or other client devices in its proximity. The early QoS warning can be provided to the application, allowing the application to take precautionary actions such as e.g. enter into a safe-mode. The client device according to the first aspect further enables the solution to be triggered autonomously in the client device with only a semi-static configuration from the network. Hence, avoiding a real-time dependency towards the network at the moment of detection of QoS degradation. Furthermore, with the QoS monitoring configuration the monitoring and detection of non-fulfilment of latency requirements can be tuned towards different services such that optimized per service reliability can be achieved.

In an implementation form of a client device according to the first aspect, the client device is further configured to monitor transmissions of uplink data packets associated with the application, in the first layer, for fulfilment of latency requirements of the uplink data packets based on the QoS monitoring configuration;

provide a second indication to the second layer upon detection of a fulfilment of a latency requirement.

An advantage with this implementation form is that the application can be informed, via the second layer, when the QoS requirement is fulfilled again. The application can then resume its normal service and stop any precautionary action.

In an implementation form of a client device according to the first aspect, the QoS monitoring configuration indicates a latency timer.

An advantage with this implementation form is that the latency timer provides an easy way of monitoring for non-fulfilment of latency requirements which can be adapted based on higher layer parameters. Thereby, the monitoring and detection of non-fulfilment of latency requirements can be tuned towards different services such that optimized per service reliability is achieved.

In an implementation form of a client device according to the first aspect, the client device is further configured to start the latency timer upon reception, in the first layer, of a data packet for uplink transmission.

The latency timer can be denoted latency time window.

An advantage with this implementation form is that the latency timer can be started based on an event which is well defined in existing protocol stacks, e.g. the NR protocol stack. The triggering of the latency timer can thereby be implemented with limited specification impact. Furthermore, it allows detection of non-fulfilment of latency requirements per uplink data packet.

In an implementation form of a client device according to the first aspect, the value of the latency timer is dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter.

The survival time can be a time period that an application consuming a communication service may continue without an anticipated message.

An advantage with this implementation form is that the latency timer can be adapted based on higher layer parameters such that the monitoring and detection of non-fulfilment of latency requirements can be tuned towards different services. Thereby, achieving optimized per service reliability In an implementation form of a client device according to the first aspect, the first layer is a medium access control layer, and wherein the latency timer is associated with any of an uplink logical channel, an uplink logical channel group, and a scheduling request configuration for transmissions of uplink data packets.

An advantage with this implementation form is that it can be implemented with limited specification impact since it matches existing protocol stacks, e.g. the NR protocol stack. The latency timer can further be set to match traffic mapped to a specific logical channel, thereby achieving optimised per service reliability.

In an implementation form of a client device according to the first aspect, the client device is further configured to start the latency timer when a regular buffer status report procedure has been triggered.

An advantage with this implementation form is that the latency timer can be started based on an event which is well defined in existing protocol stacks, e.g. the NR protocol stack. The triggering of the latency timer can thereby be implemented with limited specification impact.

In an implementation form of a client device according to the first aspect, transmission of an uplink data packet is associated with a dynamic grant, and detection of a non-fulfilment of the latency requirement comprises at least one of detection of a non-fulfilment of the latency requirement if a dynamic grant is not received before expiry of the latency timer;

detection of a non-fulfilment of the latency requirement if an uplink data channel duration for transmission of an uplink data packet ends after expiry of the latency timer; and detection of a non-fulfilment of the latency requirement if a negative acknowledgment associated with transmission of an uplink data packet is received before expiry of the latency timer.

An advantage with this implementation form is that non-fulfilment of the latency requirement for transmission using dynamic grant can be detected based on existing well defined events in combination with the latency timer. Thereby, providing a detection solution which can be implemented with limited specification impact.

In an implementation form of a client device according to the first aspect, transmission of an uplink data packet is associated with a configured grant, and detection of a non-fulfilment of the latency requirement comprises at least one of detection of a non-fulfilment of the latency requirement if an uplink data channel duration associated with a configured grant ends after expiry of the latency timer;

detection of anon-fulfilment of the latency requirement if an uplink data channel duration for a retransmission of an uplink data packet, using a dynamic grant, ends after expiry of the latency timer; and detection of a non-fulfilment of the latency requirement if a negative acknowledgment associated with transmission of an uplink data packet is received before expiry of the latency timer.

An advantage with this implementation form is that non-fulfilment of the latency requirement for transmission using configured grant can be detected based on existing well-defined events in combination with the latency timer. Thereby, providing a detection solution which can be implemented with limited specification impact.

In an implementation form of a client device according to the first aspect, the second layer is radio link control layer.

An advantage with this implementation form is that it can be implemented with limited specification impact since it matches existing protocol stacks, e.g. the NR protocol stack.

In an implementation form of a client device according to the first aspect, the first layer is a packet data convergence protocol layer, and wherein the latency timer is associated with any of a radio bearer and a radio link control channel for transmissions of uplink data packets.

An advantage with this implementation form is that it can be implemented with limited specification impact since it matches existing protocol stacks, e.g. the NR protocol stack. The latency timer can further be set to match traffic mapped to a specific radio bearer and/or a radio link control channel, thereby achieving optimised per service reliability.

In an implementation form of a client device according to the first aspect, detection of a non-fulfilment of the latency requirement comprises at least one of detection of a non-fulfilment of the latency requirement if no confirmation of transmission of an uplink data packet is obtained from a lower layer prior to expiry of the latency timer; and detection of a non-fulfilment of the latency requirement if no confirmation of successful delivery of an uplink data packet is obtained from a lower layer prior to expiry of the latency timer.

An advantage with this implementation form is that it provides a general solution for detection of non-fulfilment of the latency requirements applicable in multiple layers of existing protocol stacks, e.g. the NR protocol stack. Thereby, the robustness of the detection of non-fulfilment of the latency requirements can be increased.

In an implementation form of a client device according to the first aspect, the second layer is service data adaptation protocol layer or packet data convergence protocol layer.

An advantage with this implementation form is that it can be implemented with limited specification impact since it matches existing protocol stacks, e.g. the NR protocol stack.

According to a second aspect of the invention, the above mentioned and other objectives are achieved with a method for a client device, the method comprises obtaining a QoS monitoring configuration associated with an application;
monitoring transmissions of uplink data packets associated with the application, in a first layer, for non-fulfilment of latency requirements of the uplink data packets based on the QoS monitoring configuration;
providing a first indication to a second layer upon detection of a non-fulfilment of a latency requirement.

The method according to the second aspect can be extended into implementation forms corresponding to the implementation forms of the client device according to the first aspect. Hence, an implementation form of the method comprises the feature(s) of the corresponding implementation form of the client device.

The advantages of the methods according to the second aspect are the same as those for the corresponding implementation forms of the client device according to the first aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which:

FIGS. 7a-c show dynamic grant transmission of an uplink data packet according to an embodiment of the invention;

FIGS. 8a-c show dynamic grant transmission of an uplink data packet according to an embodiment of the invention;

FIGS. 9a-c show configured grant transmission of an uplink data packet according to an embodiment of the invention.

DETAILED DESCRIPTION

The feature notification control has been introduced to allow the core network (CN) to be notified by the radio access network (RAN) when a negotiated QoS cannot be met. Notification control is applicable for guaranteed bit rate flows. The core network requests the radio access network to notify the core network, during a packet data unit (PDU) session life span, when a negotiated QoS cannot be met. This feature is intended for applications which can adjust to changes in QoS, e.g. video streaming where the video codec bit rate may be adjusted dynamically. For example, when an application in the data network is notified that a negotiated QoS cannot be met it can adjust its codec rate and the radio access network may then, if needed, reconfigure the data radio bearer to the client device to better suit the new bit rate.

In the lower layers, the client device monitors the radio link connection. Radio link failure (RLF) is declared in the client device after a certain preconfigured number of detected out-of-synchronizations (3GPP TS 38.133, section 8.1). An out-of-synchronization is defined as a certain number of radio link measurements over a time period, typically 50-500 ms, where the signal-to-interference and noise ratio (SINR) is too low to achieve sufficient downlink control channel decoding performance. At RLF, upper layers in the client device report "No-Service" to applications, while lower layers try to restore the radio link or search for a new radio link.

Notification control is based in the core network with assistance from the radio access network. Interaction with the application in the client device would go via the core network to the corresponding application in the data network and then to the application in the client device. This is a slow mechanism and it further requires a working link to the client device, if the application in the data network would like to communicate with the application in client device upon a reported notification control. Hence, for URLLC use cases, this notification is too slow.

The RLF procedure is performed in the client device but it is also a slow mechanism. The purpose is to declare the radio link as lost and not to detect QoS problems early. The RLF procedure is suitable for enhanced mobile broadband (eMBB) type of applications but for sensitive URLLC applications the RLF procedure is too slow, typically in the order of 100 ms instead of single ms. Hence, the RLF procedure does not allow the application to take any precautionary actions. Setting the parameters for RLF to enable the client device to declare RLF at an earlier time may lead to unnecessary amount of radio link recovery procedures and increase the time spent with no service.

Hence, the inventors realize that there is a need for a solution for declaring problems with the connection serving an application with fast response time compared to current conventional solutions.

Figure 1:
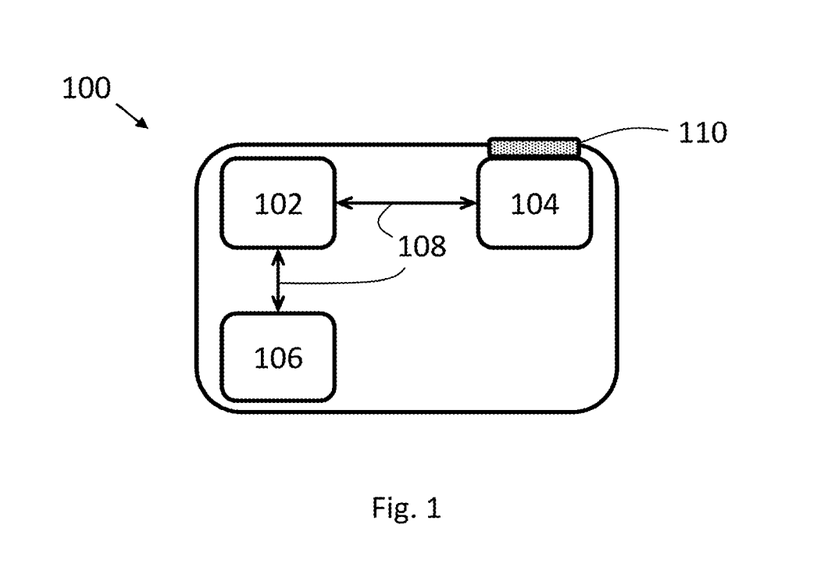
FIG. 1 shows a client device according to an embodiment of the invention.

FIG. 1 shows a client device 100 according to an embodiment of the invention. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system.

That the client device 100 is configured to perform certain actions can in this disclosure be understood to mean that the client device 100 comprises suitable means, such as e.g. the processor 102 and the transceiver 104, configured to perform said actions.

According to embodiments of the invention the client device 100 is configured to obtain a QoS monitoring configuration associated with an application and monitor transmissions of uplink data packets associated with the application, in a first layer, for non-fulfilment of latency requirements of the uplink data packets based on the QoS monitoring configuration. The client device 100 is further configured to provide a first indication 120 to a second layer upon detection of a non-fulfilment of a latency requirement.

Figure 2:
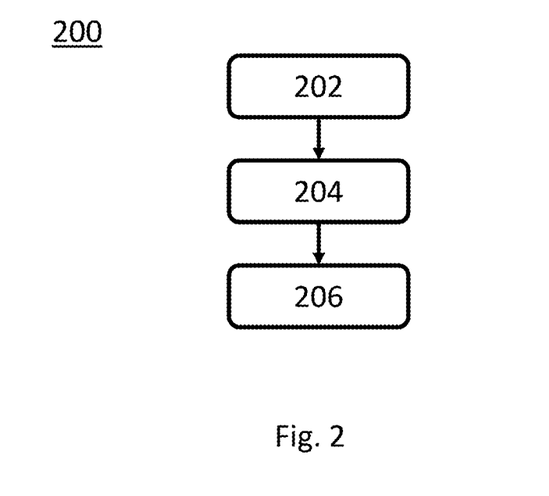
FIG. 2 shows a method for a client device according to an embodiment of the invention.

FIG. 2 shows a flow chart of a corresponding method 200 which may be executed in a client device 100, such as the one shown in FIG. 1. The method 200 comprises obtaining 202 a QoS monitoring configuration associated with an application and monitoring 204 transmissions of uplink data packets associated with the application, in a first layer, for non-fulfilment of latency requirements of the uplink data packets based on the QoS monitoring configuration. The method 200 further comprises providing 206 a first indication 120 to a second layer upon detection of a non-fulfilment of a latency requirement.

Figure 3:
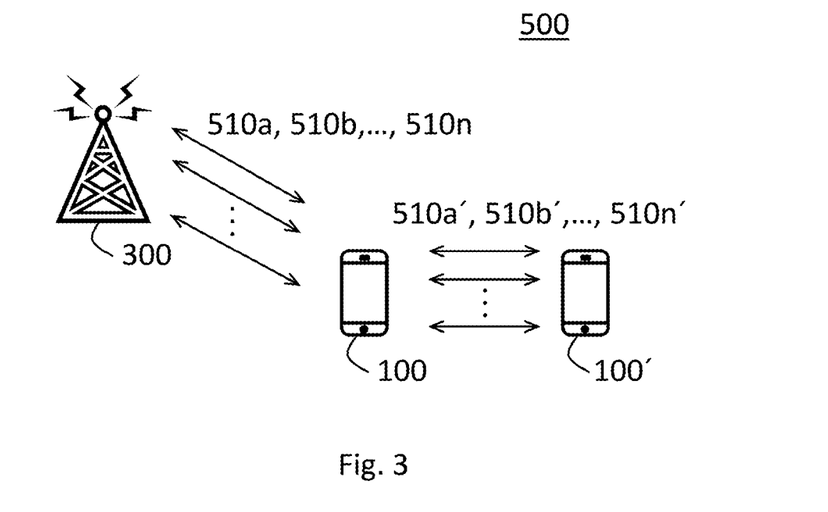
FIG. 3 shows a wireless communication system according to an embodiment of the invention.

FIG. 3 shows a wireless communication system 500 according to an embodiment of the invention. The wireless communication system 500 comprises a client device 100, in this embodiment denoted a first client device 100, a second client device 100', and a network access node 300 configured to operate in the wireless communication system 500. In the wireless communication system 500, one or more radio links 510a, 510b, ..., 510n are established between the network access node 300 and the first client device 100 to serve an application in the first client device 100. The application in the first client device 100 may be communicating with a corresponding application in a data network (not shown in FIG. 3) via the network access node 300 and a core network (not shown in FIG. 3). The radio links 510a, 510b, ..., 510n are established to fulfil a certain QoS requested by the application. Alternatively or in addition, one or more radio links 510a', 510b', ..., 510n' may be established between the first client device 100 and the second client device 100' to serve the application in the first client device 100. The one or more radio links 510a', 510b', ..., 510n' may e.g. be NR sidelinks (SL), sometimes referred to as PC5 interfaces.

According to embodiments of the invention a solution for detecting and indicating non-fulfilment of latency requirements of uplink data packets associated with the application in the client device 100 is introduced. The non-fulfilment of a latency requirement of an uplink data packet is detected in a first layer and a first indication is provided to a second layer upon detection. The detection and indication of non-fulfilment of latency requirements of uplink data packets according to the invention may be used to support a procedure for early indication of QoS non-fulfilment to the application in the client device 100. For example, a QoS non-fulfilment indication may be provided to the application based on one or more first indications. The QoS non-fulfilment indication may hence be triggered with low latency and can give the application an early warning of QoS problems on the radio links 510a, 510b, ..., 510n, 510a', 510b', ..., 510n' used by the application. The low latency of the QoS non-fulfillment indication makes it suitable for future applications types targeted for 5G, e.g. applications where failures to meet QoS can have dire consequences to the client device 100 hosting the application or other client devices in its proximity. The QoS non-fulfillment indication can be used to trigger, autonomously in the client device 100, a pre-programed behavior in the application. Examples of such pre-programmed behavior in the application is to take precautionary actions and/or enter into a "safe-mode". Practical examples of such "safe-mode" for in the vehicle-to-anything (V2X) area could be to decrease the speed and increase the distance between vehicles. For factory automation an actor, such as a robot, may simply halt its current activity. A drone may hover or return to a predefined location.

The introduction of the QoS non-fulfillment indication may play a vital role as a safety mechanism for future 5G applications, as a tool to prevent potential dire issues that could be caused by an instantaneous QoS degradation in respect of latency requirements.

Embodiments of the invention introduces a solution that can be used to support QoS non-fulfillment indication to an application in a client device. The detection method according to the invention identifies non-fulfilment of latency requirements for uplink data packets associated with the application in the client device 100. The detection method can detect latency problems with uplink transmission for both dynamic grant and configured grant, where configured grant can be of type 1 or type 2.

Figure 4:
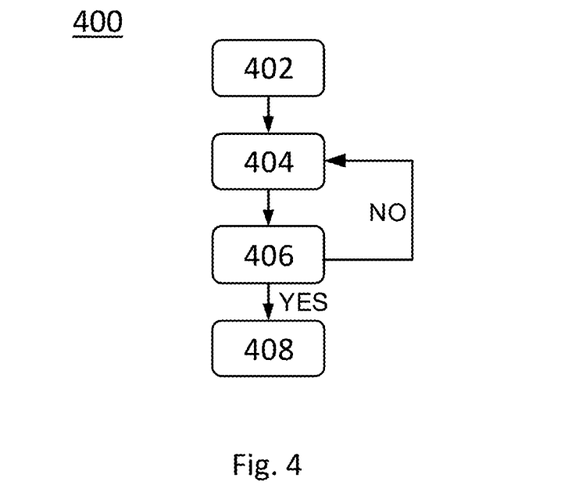
FIG. 4 shows a method for detection of non-fulfilment of latency requirements according to an embodiment of the invention.

FIG. 4 shows a flow chart of a method 400 for detection of non-fulfilment of latency requirements according to an embodiment of the invention. The method 400 may be performed in the client device 100. In step 402, the client device 100 obtains a QoS monitoring configuration associated with an application. The client device 100 may obtain the QoS monitoring configuration e.g. from the network access node 300 and/or based on a predefined rule. The obtained QoS monitoring configuration may e.g. be based on QoS characteristics for one or more QoS flows or IP packet flows associated with the application.

In embodiments, the QoS monitoring configuration may indicate a latency timer. The latency timer may also be denoted a latency time window. The value of the latency timer may be dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter. The resource type indicates whether a QoS flow is of the type guaranteed bit rate (GBR), delay-critical GBR, or non-GBR flow. The definition of packet error rate and packet delay budget are different for GBR and delay-critical GBR resource types. Furthermore, the survival time can be the time period that an application consuming a communication service may continue without an anticipated message.

In step 404, the client device 100 monitor transmissions of uplink data packets associated with the application, in a first layer, for non-fulfilment of latency requirements of the uplink data packets based on the obtained QoS monitoring configuration. The monitoring in step 404 may be triggered when the client device 100 receives a data packet for uplink transmission in the first layer. In embodiments where the QoS monitoring configuration indicates a latency timer, the monitoring in step 404 may be based on the latency timer which may be started when the client device 100 receives the uplink data packet. The client device 100 may hence start the latency timer upon reception, in the first layer, of a data packet for uplink transmission.

In step 406, the client device 100 checks whether a non-fulfilment of latency requirements has been detected. Upon detection of a non-fulfilment of a latency requirement in step 406, the client device 100 provide a first indication 120 to a second layer in step 408. If no non-fulfilment of latency requirements is detected in step 406, the client device 100 continuous to monitor transmissions of uplink data packets in the first layer for non-fulfilment of latency requirements in step 404.

Figure 5:
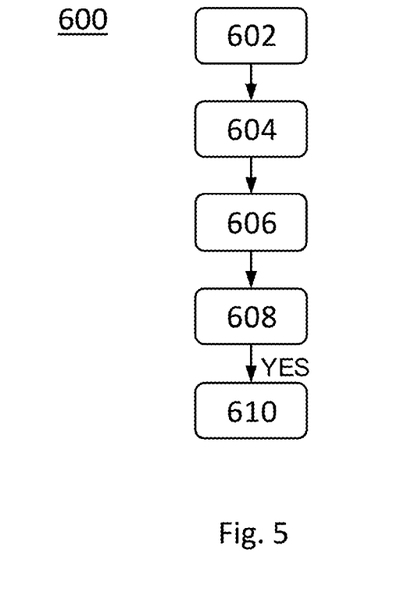
FIG. 5 shows a method for detection of non-fulfilment of latency requirements according to an embodiment of the invention.

According to embodiments of the invention the first layer is a medium access control (MAC) layer, and the latency timer is associated with any of an uplink logical channel, an uplink logical channel group, and a scheduling request configuration for transmissions of uplink data packets. Furthermore, the second layer may be a radio link control (RLC) layer. FIG. 5 shows a flow chart of a method 600 according to such an embodiment. In step 602, the client device 100 obtains a QoS monitoring configuration indicating the latency timer. The latency timer is in this embodiment associated with an uplink logical channel. The uplink logical channel may e.g. have the latency timer configured when monitoring for QoS non-fulfillment is activated for a QoS flow which is mapped to the uplink logical channel. As previously described the value of the latency timer may be dependent on one or more characteristics of QoS flows or IP packet flows associated with the application. Different uplink logical channels may be configured with different values of the latency timer. For example, if multiple QoS flow with different characteristics have been configured in higher layers for monitoring of QoS non-fulfillment.

In step 604, a data packet for uplink transmission is received in the MAC layer and the client device 100 start the latency timer. The data packet is to be transmitted using the uplink logical channel associated with the latency timer. The client device 100 may further start the latency timer when a regular buffer status report procedure has been triggered.

The client device 100 monitor transmissions of the uplink data packet in step 606 for non-fulfilment of latency requirements. The transmission of the uplink data packet may be associated with a dynamic grant or a configured grant. If the transmission of the uplink data packet is associated with a dynamic grant, the client device 100 starts a scheduling request procedure, as shown e.g. in FIGS. 7*a-c*.

In step 608, the client device 100 checks whether a non-fulfilment of latency requirements has been detected. The detection of a non-fulfilment of the latency requirement in step 608 may comprises the client device 100 assessing/comparing the grant information with the latency timer.

In embodiments where the transmission of the uplink data packet is associated with a dynamic grant, the detection of a non-fulfilment of the latency requirement in step 608 comprises at least one of detection of a non-fulfilment of the latency requirement if a dynamic grant is not received before expiry of the latency timer; detection of a non-fulfilment of the latency requirement if an uplink data channel duration for transmission of an uplink data packet ends after expiry of the latency timer; and detection of a non-fulfilment of the latency requirement if a negative acknowledgment associated with transmission of an uplink data packet is received before expiry of the latency timer.

In embodiments where the transmission of the uplink data packet is associated with a configured grant, the detection of a non-fulfilment of the latency requirement in step 608 comprises at least one of detection of a non-fulfilment of the latency requirement if an uplink data channel duration associated with a configured grant ends after expiry of the latency timer; detection of a non-fulfilment of the latency requirement if an uplink data channel duration for a retransmission of an uplink data packet, using a dynamic grant, ends after expiry of the latency timer; and detection of a non-fulfilment of the latency requirement if a negative acknowledgment associated with transmission of an uplink data packet is received before expiry of the latency timer.

If a non-fulfilment of the latency requirement is detected in step 608, the client device 100 provides a first indication 120 to the second layer in step 610. The second layer may be a radio link control (RLC) layer. If no non-fulfilment of latency requirements is detected in step 608, the client device 100 does not send any first indication 120.

Figure 6:
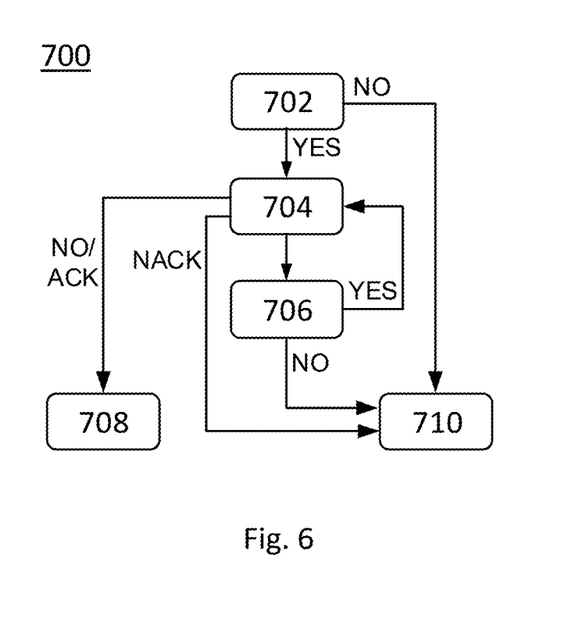
FIG. 6 shows a method for detection of non-fulfilment of latency requirements according to an embodiment of the invention.

Further details of the detection of a non-fulfilment of the latency requirement is described with reference to FIG. 6. FIG. 6 shows a flow chart of a method 700 for detection of a non-fulfilment of the latency requirement according to embodiments of the invention. The method 700 may be performed when an uplink data packet has been received in the MAC layer. In step 702, the client device 100 checks whether a grant is obtained and if the grant is within a time window defined by the latency timer, i.e. occurs before the latency timer expires. The grant may be a received dynamic grant or a configured grant. If no grant is obtained or the grant is outside the time window, i.e. the outcome of the check in step 702 is NO, a first indication 120 is provided to the second layer in step 710. On the other hand, if the grant is within the time window, i.e. the outcome of the check in step 702 is YES, the client device 100 checks in step 704 whether any feedback has been received for the physical uplink shared channel (PUSCH) transmission according to the grant. In case no feedback or an explicit acknowledgment (ACK) is received within the time window, the client device 100 moves to step 708 where the method 700 ends without providing a first indication 120 to the second layer. If a negative acknowledgment (NACK) without a new grant is received, a first indication 120 is provided to the second layer in step 710. If the feedback in step 704 is a new grant for a PUSCH retransmission, the new grant is assessed in relation to the time window in step 706 to check if the new grant is within the time window. If the new grant is outside the time window, i.e. the outcome of the check in step 706 is NO, a first indication 120 is provided to the second layer in step 710. On the other hand, if the grant is within the time window, i.e. the outcome of the check in step 706 is YES, the client device 100 again checks the feedback to the transmission in step 704. Thus, the client device 100 will provide a first indication 120 in step 710 if the feedback to the retransmission is a NACK or a new grant outside the time window and the client device 100 will end the method 700 without providing a first indication in step 708 if no feedback or an explicit ACK is received within the time window.

According to embodiments of the invention the first layer is a packet data convergence protocol (PDCP) layer, and the latency timer is associated with any of a radio bearer and a radio link control channel for transmissions of uplink data packets. In such embodiments, the monitoring for non-fulfilment of latency requirements is hence performed in the PDCP layer. The monitoring in the PDCP layer may comprise monitoring for confirmation of transmission and/or delivery of uplink data packets from lower layers, e.g. from the MAC layer. The monitoring is based on the latency timer which may be started upon reception in the PDCP layer of a data packet for uplink transmission. The value of the latency timer is based on the radio bearer and/or the radio link control channel for transmissions of uplink data packets. The detection of a non-fulfilment of the latency requirement may be based on whether a confirmation of transmission or a confirmation of successful delivery is received before the latency timer expires or not. Hence, detection of a non-fulfilment of the latency requirement may comprise at least one of detection of a non-fulfilment of the latency requirement if no confirmation of transmission of an uplink data packet is obtained from a lower layer prior to expiry of the latency timer; and detection of a non-fulfilment of the latency requirement if no confirmation of successful delivery of an uplink data packet is obtained from a lower layer prior to expiry of the latency timer. The confirmation of transmission may be a confirmation that the transmission of an uplink data packet has been completed, while the confirmation of successful delivery may be a confirmation that the transmission of an uplink data packet has been successfully received at the network access node 300.

In embodiments where the first layer is the PDCP layer, the second layer may be a service data adaptation protocol (SDAP) layer or the PDCP layer. Thus, upon detection of a non-fulfilment of a latency requirement the first indication 120 is provided to the SDAP layer or the PDCP layer. The SDAP layer and the PDCP layer may perform filtering based on received first indications 120 and/or other indications of QoS non-fulfillment received from other detection methods.

FIGS. 7-10 show different examples of detection and non-detection of non-fulfillment of latency requirements in the MAC layer when dynamic and configured grants are used for uplink transmission. In the examples, the PUSCH transmission may or may not include repetitions. Furthermore, there is a misalignment period (denoted Pmis in FIGS. 7-10) included. The misalignment period is a variable time period that represents the time period from when the uplink data packet (denoted DPUL in FIGS. 7-10) arrives in the user plane protocol stack until the start of the scheduling request (SR) occasion (box "SR" in FIGS. 7-10) for dynamic grant or configured grant PUSCH occasion (box "CG PUSCH" in FIGS. 7-10). In FIGS. 7-10, the latency timer (denoted $T_{latency}$ in FIGS. 7-10) is started upon the reception of the uplink data packet. However, the latency timer may in embodiments instead be started after the misalignment period such that the start of the latency timer is aligned with the SR occasion for dynamic grant or configured grant PUSCH occasion.

Figure 7A:
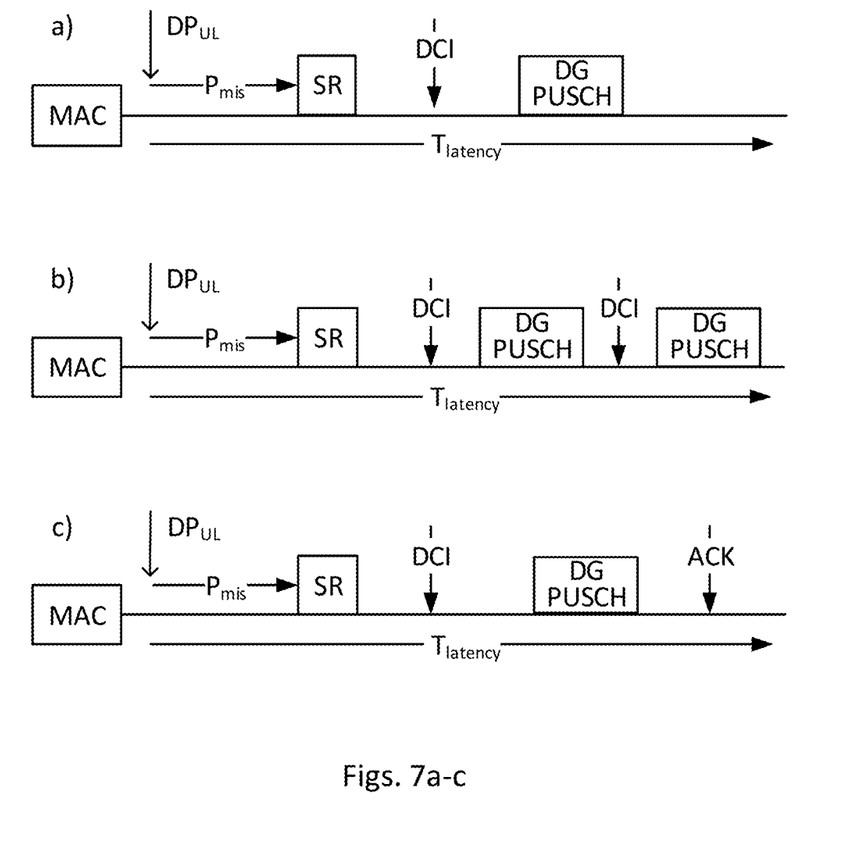

FIGS. 7a-c shows three examples of transmission of an uplink data packet using dynamic grant, where no first indication 120 is provided to the second layer. In FIGS. 7a-c, the SR is sent in the SR occasion and a downlink control information (DCI) is received from the network indicating a PUSCH occasion (box "DG PUSCH" in FIGS. 7-10) ending before the latency timer expires. Hence, the uplink data packet can be transmitted before expiry of the latency timer. In FIG. 7b, a retransmission is performed in an additional dynamic grant PUSCH occasion ending before the latency timer expires. In FIG. 7c, the client device 100 receives an explicit hybrid automatic repeat request (HARQ) ACK from the network before the latency timer expires. Hence, the uplink data packet is successfully transmitted before the latency timer expires and assumed or confirmed to be successfully delivered in all three examples. Therefore, non-fulfillment of latency requirements is not detected and no first indication 120 is provided to the second layer. FIGS. 7a and c show one dynamic grant PUSCH occasion and FIG. 7b shows two dynamic grant PUSCH occasions within the latency timer. However, there can be any number of dynamic grant PUSCH occasions within the latency timer without the first indication 120 being provided so long as the last dynamic grant PUSCH occasion ends before the latency timer expires.

Figure 8A:
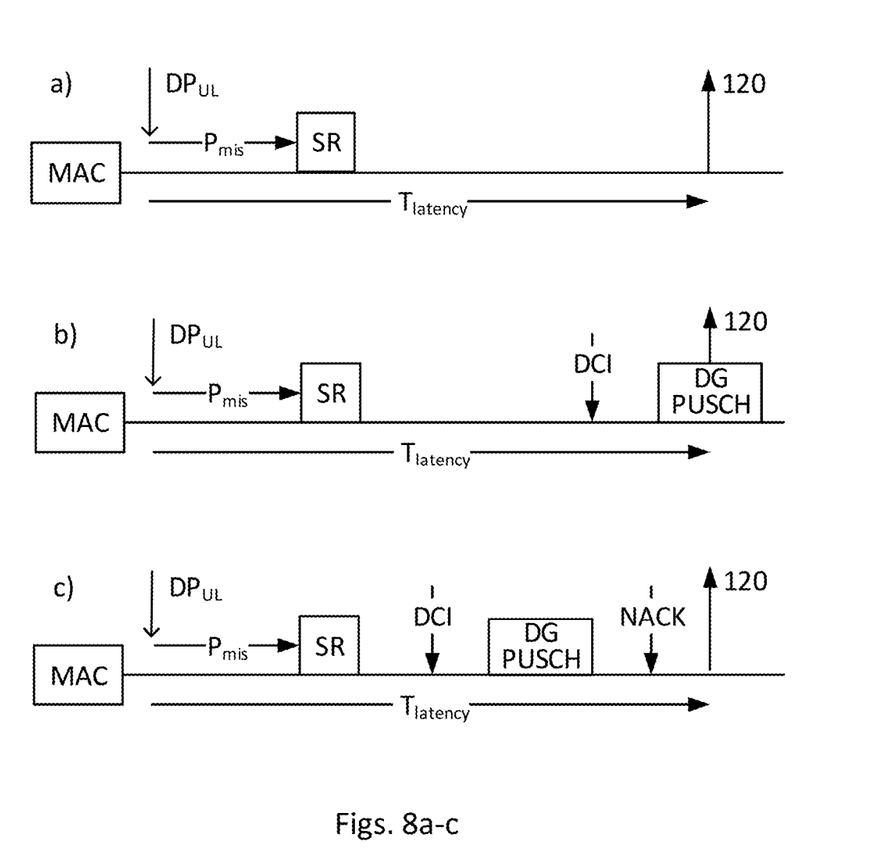

FIGS. 8a-c show three examples of transmission of an uplink data packet using dynamic grant, where the first indication 120 is provided to the second layer. In FIG. 8a, the SR is sent in the SR occasion but no feedback is received within the latency timer. In FIG. 8b, a DCI is received in response to the SR but the DCI indicates a PUSCH occasion ending after the expiry of the latency timer. In FIG. 8c, a DCI is received in response to the SR and the transmission in the PUSCH occasion is performed before the latency timer expires. However, a HARQ NACK without any further grant is received before the latency timer expires. Hence, the uplink data packet cannot be successfully transmitted in FIGS. 8a-b and not successfully delivered in FIG. 8c before the latency timer expires. Therefore, non-fulfillment of latency requirements is detected and the first indication 120 is provided to the second layer upon expiry of the latency timer, as shown in FIGS. 8a-c. Note, there can be any number of PUSCH occasions before the PUSCH occasion ending after the expiry of the latency timer or before the HARQ NACK.

Figure 9A:
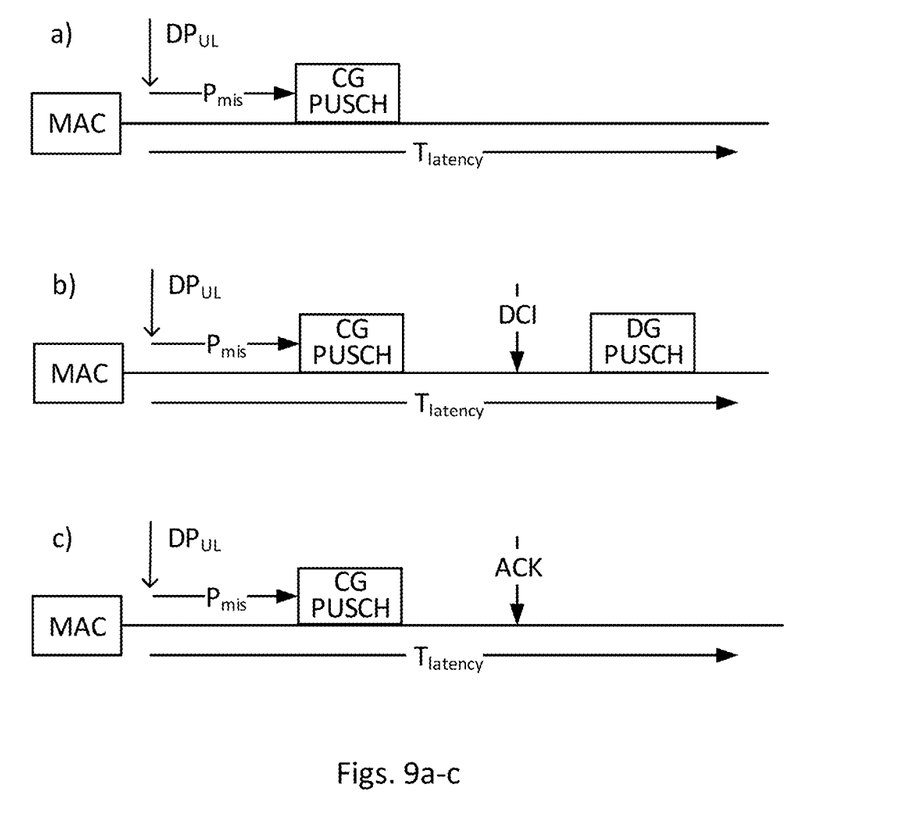
Figure 10A:
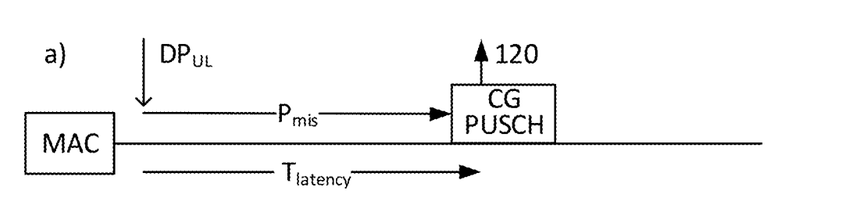
FIGS. 10a-c show configured grant transmission of an uplink data packet according to an embodiment of the invention.
Figure 10B:
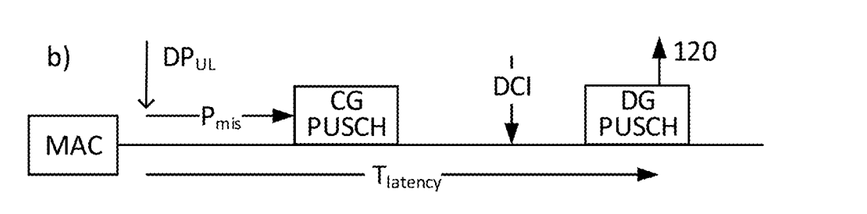
Figure 10C:
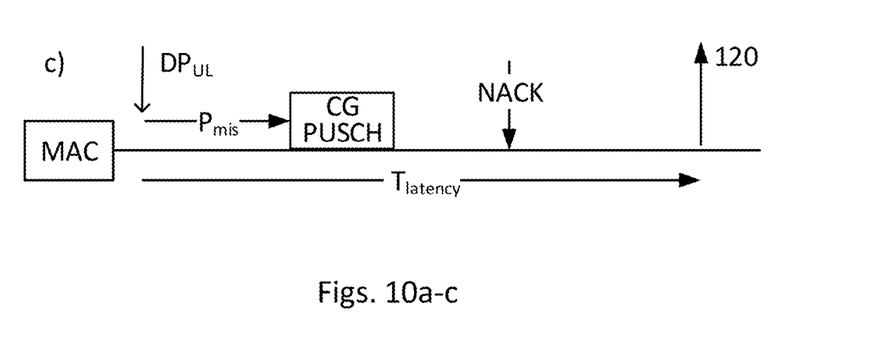

FIGS. 9a-c shows three examples of transmission of an uplink data packet using configured grant, at least for the initial transmission, where no first indication 120 is provided to the second layer. In FIGS. 9a-c, the transmission in the configured grant PUSCH occasion is performed. In FIG. 9a, no further feedback is received before the latency timer expires. In FIG. 9b, a DCI indicating an additional dynamic grant PUSCH occasion for retransmission is received. The additional dynamic grant PUSCH occasion ends before the latency timer expires. In FIG. 9c, an explicit HARQ ACK is received in response to the transmission in the configured grant PUSCH occasion. Hence, the uplink data packet is successfully transmitted before the latency timer expires and assumed or confirmed to be successfully delivered in all three examples. Therefore, non-fulfillment of latency requirements is not detected and no first indication 120 is provided to the second layer. Note, there can be any number of PUSCH occasions before the expiry of the latency timer FIGS. 10a-c shows three examples of transmission of an uplink data packet using configured grant, at least for the initial transmission, where the first indication 120 is provided to the second layer. In FIG. 10a, the configured grant PUSCH occasion ends after the expiry of the latency timer. In FIG. 10b, a DCI indicating an additional dynamic grant PUSCH occasion is received for retransmission but the dynamic grant PUSCH occasion ends after the expiry of the latency timer. In FIG. 10c, a HARQ NACK without any further grant is received before the latency timer expires. Hence, the uplink data packet cannot be successfully transmitted in FIGS. 10a-b and not successfully delivered in FIG. 10c before the latency timer expires. Therefore, non-fulfillment of latency requirements is detected and the first indication 120 is provided to the second layer upon expiry of the latency timer, as shown in FIGS. 10a-c. Note, there can be any number of PUSCH occasions before the PUSCH occasion ending after the expiry of the latency timer or before the HARQ NACK.

It is envisaged that embodiments of the invention can be implemented in 3GPP standard. For example, the latency timer herein disclosed may e.g. be added as a new parameter in the LogicalChannelConfig information element (IE). The latency timer parameter may in an example be specified in number of symbol units. Information related to when the latency timer should be started may e.g. be added to section 5.4.5 in TS 38.321. Possible actions performed upon expiry of the latency timer may be specified in a new section under MAC procedures in TS 38.321, while possible actions when transmission feedback is received from the network can be specified in section 5.4.1 in TS 38.321. Furthermore, the handling of the first indication by the RLC may be specified in TS 38.322, e.g. the first indication may e.g. be included in sections 4.3.1 and 4.3.1 as a service to be provided to upper layers and expected from lower layers, respectively, and a new section may be added to specify that the RLC should forward first indications received from lower layers to upper layers.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 may be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A client device for a wireless communication system, the client device comprising:
   a processor; and
   a memory coupled to the processor and having processor-executable instructions stored thereon, which is executed by the processor and cause the processor to:
   obtain a Quality-of-Service (QoS) monitoring configuration associated with an application;
   monitor transmissions of uplink data packets associated with the application, in a first layer, for non-fulfilment of latency requirements of the uplink data packets based on the QoS monitoring configuration; and
   provide a first indication to a second layer upon detection of a non-fulfilment of a latency requirement,
   wherein the first layer is a medium access control layer, and wherein the latency timer is associated with any of an uplink logical channel, an uplink logical channel group, and a scheduling request configuration for transmissions of uplink data packets,
   wherein transmission of an uplink data packet is associated with a dynamic grant, and wherein detection of a non-fulfilment of the latency requirement comprises at least one of the group consisting of:
   detection of a non-fulfilment of the latency requirement in response to a dynamic grant being not received before expiry of the latency timer;
   detection of a non-fulfilment of the latency requirement in response to an uplink data channel duration for transmission of an uplink data packet ending after expiry of the latency timer; and
   detection of a non-fulfilment of the latency requirement in response to a negative acknowledgment associated with transmission of an uplink data packet being received before expiry of the latency timer.

2. The client device according to claim 1, wherein the processor is further configured to:
   monitor transmissions of uplink data packets associated with the application, in the first layer, for fulfilment of latency requirements of the uplink data packets based on the QoS monitoring configuration; and provide a second indication to the second layer upon detection of a fulfilment of a latency requirement.

3. The client device according to claim 1, wherein the QoS monitoring configuration indicates a latency timer.

4. The client device according to claim 3, wherein the processor is further configured to:
start the latency timer upon reception, in the first layer, of a data packet for uplink transmission.

5. The client device according to claim 3, wherein the value of the latency timer is dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter.

6. The client device according to claim 1, wherein the processor is further configured to:
start the latency timer in response to a regular buffer status report procedure having been triggered.

7. A client device for a wireless communication system, the client device comprising:
a processor; and
a memory coupled to the processor and having processor-executable instructions stored thereon, which is executed by the processor and cause the processor to:
obtain a Quality-of-Service (QoS) monitoring configuration associated with an application;
monitor transmissions of uplink data packets associated with the application, in a first layer, for non-fulfilment of latency requirements of the uplink data packets based on the QoS monitoring configuration; and
provide a first indication to a second layer upon detection of a non-fulfilment of a latency requirement,
wherein the first layer is a medium access control layer, and wherein the latency timer is associated with any of an uplink logical channel, an uplink logical channel group, and a scheduling request configuration for transmissions of uplink data packets,
wherein transmission of an uplink data packet is associated with a configured grant, and wherein detection of a non-fulfilment of the latency requirement comprises at least one of the group consisting of:
detection of a non-fulfilment of the latency requirement in response to an uplink data channel duration associated with a configured grant ending after expiry of the latency timer;
detection of a non-fulfilment of the latency requirement in response to an uplink data channel duration for a retransmission of an uplink data packet, using a dynamic grant, ending after expiry of the latency timer; and
detection of a non-fulfilment of the latency requirement in response to a negative acknowledgment associated with transmission of an uplink data packet being received before expiry of the latency timer.

8. The client device according to claim 1, wherein the second layer is radio link control layer.

9. The client device according to claim 1, wherein the first layer is a packet data convergence protocol layer, and wherein the latency timer is associated with any of a radio bearer and a radio link control channel for transmissions of uplink data packets.

10. A client device for a wireless communication system, the client device comprising:
a processor; and
a memory coupled to the processor and having processor-executable instructions stored thereon, which is executed by the processor and cause the processor to:
obtain a Quality-of-Service (QoS) monitoring configuration associated with an application;
monitor transmissions of uplink data packets associated with the application, in a first layer, for non-fulfilment of latency requirements of the uplink data packets based on the QoS monitoring configuration; and
provide a first indication to a second layer upon detection of a non-fulfilment of a latency requirement,
wherein the first layer is a packet data convergence protocol layer, and wherein the latency timer is associated with any of a radio bearer and a radio link control channel for transmissions of uplink data packets,
wherein detection of the non-fulfilment of the latency requirement comprises at least one of the group consisting of:
detection of a non-fulfilment of the latency requirement in response to no confirmation of transmission of an uplink data packet being obtained from a lower layer prior to expiry of the latency timer; and
detection of a non-fulfilment of the latency requirement in response to no confirmation of successful delivery of an uplink data packet being obtained from a lower layer prior to expiry of the latency timer.

11. The client device according to claim 9, wherein the second layer is service data adaptation protocol layer or packet data convergence protocol layer.

12. The client device according to claim 7, wherein the processor is further configured to:
monitor transmissions of uplink data packets associated with the application, in the first layer, for fulfilment of latency requirements of the uplink data packets based on the QoS monitoring configuration; and
provide a second indication to the second layer upon detection of a fulfilment of a latency requirement.

13. The client device according to claim 7, wherein the QoS monitoring configuration indicates a latency timer.

14. The client device according to claim 13, wherein the processor is further configured to:
start the latency timer upon reception, in the first layer, of a data packet for uplink transmission.

15. The client device according to claim 13, wherein the value of the latency timer is dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter.

16. The client device according to claim 7, wherein the processor is further configured to:
start the latency timer in response to a regular buffer status report procedure having been triggered.

17. The client device according to claim 7, wherein the second layer is radio link control layer.

18. The client device according to claim 7, wherein the first layer is a packet data convergence protocol layer, and wherein the latency timer is associated with any of a radio bearer and a radio link control channel for transmissions of uplink data packets.

19. The client device according to claim 18, wherein the second layer is service data adaptation protocol layer or packet data convergence protocol layer.

20. The client device according to claim 10, wherein the second layer is service data adaptation protocol layer or packet data convergence protocol layer.

\* \* \* \* \*